United States Patent

Goudmand et al.

[11] Patent Number: 6,074,534
[45] Date of Patent: Jun. 13, 2000

[54] METHOD OF INCREASING THE WETTABILITY OF A POROUS BODY

[75] Inventors: P. Goudmand; Odile Dessaux, both of Lille; Jean-Denis Quensierre, Croix; Vincent Bedhome, Desvres; Philippe Chavatte; José Duez, both of Boulogne Sur Mer, all of France

[73] Assignee: Conte SA, Boulogne Sur Mer, France

[21] Appl. No.: 08/797,761

[22] Filed: Feb. 7, 1997

[30] Foreign Application Priority Data

Feb. 12, 1996 [FR] France ................................. 96 01700

[51] Int. Cl.$^7$ ....................................................... B05D 3/06
[52] U.S. Cl. ............................................ 204/164; 427/562
[58] Field of Search .................................. 204/164, 165; 422/186.05; 427/562

[56] References Cited

U.S. PATENT DOCUMENTS

| | | | |
|---|---|---|---|
| 3,870,610 | 3/1975 | Baird | 204/165 |
| 5,147,678 | 9/1992 | Foerch et al. | 427/40 |
| 5,283,086 | 2/1994 | Kodama et al. | 427/576 |
| 5,344,462 | 9/1994 | Paskalov et al. | 8/115.52 |
| 5,447,756 | 9/1955 | Kamen | 427/489 |
| 5,567,243 | 10/1996 | Foster et al. | 118/730 |

FOREIGN PATENT DOCUMENTS

| | | |
|---|---|---|
| 0571953A1 | 5/1993 | European Pat. Off. . |
| 4141805A1 | 6/1993 | Germany . |
| 58-141220 | 8/1983 | Japan . |
| 59-222206 | 12/1984 | Japan . |
| 6154784 | 6/1994 | Japan . |

OTHER PUBLICATIONS

Rapport De Recherche Preliminaire (Preliminary Search Report) FA523852 FR9601700 Adhasion, G. Liebel "Oberflachenbehandling . . . " 1989.

Database WPI 83–753643 Microporous PTFE membranes for electrolysis cells—made from irradiation modified PTFE powder, May 1983.

Primary Examiner—Kathryn L. Gorgos
Assistant Examiner—Kishor Mayekar
Attorney, Agent, or Firm—Young & Basile, P.C.

[57] ABSTRACT

A method for increasing homogeneously the wettability of a porous body vis à vis a fluid includes a step in which the porous body is exposed in a treatment chamber to a nitrogen plasma generated by an electromagnetic wave discharge in nitrogen gas. Applications include increasing the wettability of a marker tip.

15 Claims, 1 Drawing Sheet

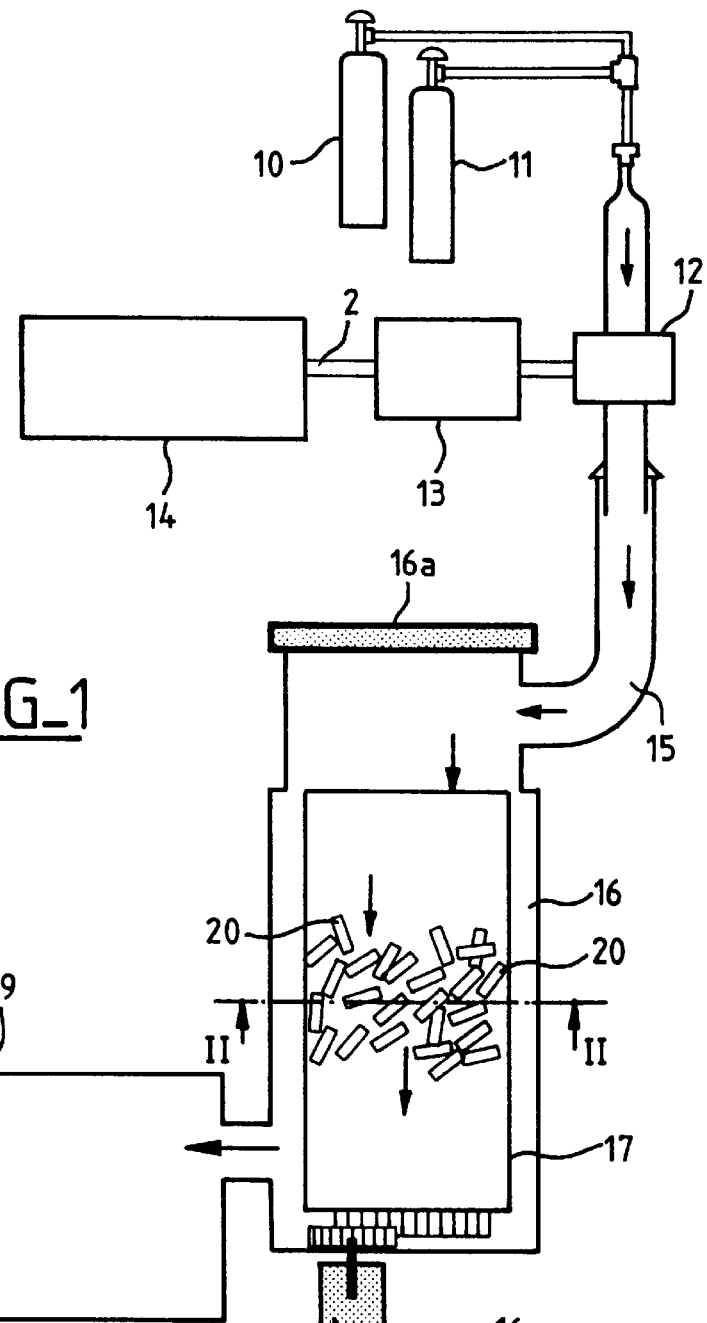
FIG_1
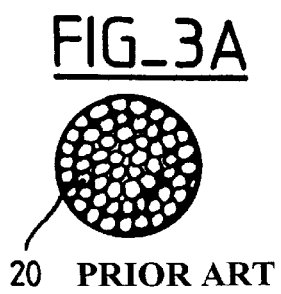
FIG_3A
20 PRIOR ART
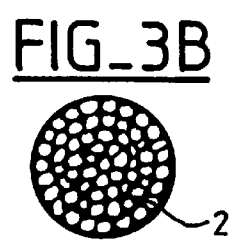
FIG_3B
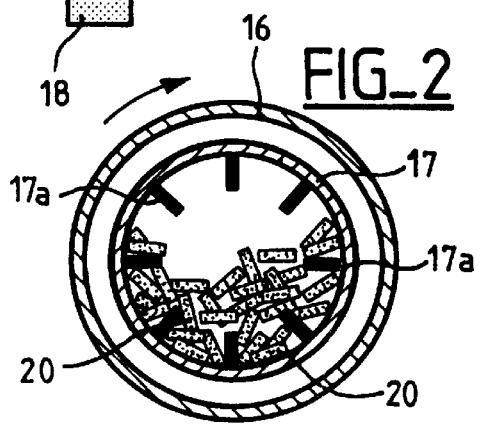
FIG_2

METHOD OF INCREASING THE WETTABILITY OF A POROUS BODY

BACKGROUND OF THE INVENTION

1. Field of the Invention

The present invention concerns a method of and a device for increasing the wettability of a porous body vis à vis a fluid.

2. Description of the Prior Art

In many industrial applications it is necessary to increase significantly the wettability of porous bodies, i.e. their hydrophilic character vis à vis liquids or gases.

Various methods are already in use. In one method that is known in itself, for example, the porous body to be treated is dipped in a bath containing surfactants and then heated to evaporate the water contained in the porous body.

This method is irksome and requires the porous body to be heated, which can cause unwanted modification of its structure or its shape if the body is made from materials having a relatively low melting point.

If the porous body is made from molded powders, in particular by sintering, mixing a powdered solid surfactant with the powders and using hydrophilic treated powders are both known in themselves.

However, when the porous body is made from such powders it is necessary to heat them to obtain the cohesion of the porous body.

In a molding process using sintering, temperatures in the order of 200° C. to 250° C. are frequently attained.

Heating disrupts the hydrophilic character of powders and the properties of the surfactants.

An aim of the present invention is to remedy the above drawbacks and to propose a treatment method that can be applied directly to porous bodies already formed, without heating them.

SUMMARY OF THE INVENTION

In the method of the invention, the porous body is exposed in a treatment chamber to a remote non-ionic post-discharge nitrogen plasma generated by electromagnetic wave discharge in nitrogen gas.

The nitrogen plasma obtained is used to increase homogeneously the wettability of a porous body vis à vis fluids.

The use of delayed nitrogen plasmas to increase the adhesion of polymer material surfaces, especially of polypropylene, is known in itself. One such use is described in European patent 88 401 329 3.

Surprisingly, the nitrogen plasma penetrates the porous body without the free nitrogen atoms becoming deactivated and the porous body can therefore be treated in the mass and rendered homogeneously hydrophilic.

This treatment method avoids any need to increase the temperature of the porous body.

Going against the teaching of "Cold Plasma in Materials Fabrication" by A. F. GRILL, I.E.E.E. Press Inc, New York, 1993, page 156, no deposit is formed inside the porous body that could otherwise block it up, which has the advantage that the size of the pores in the treated body is not changed. In the above publication, the object of treating the porous body with a cold plasma of helium or of oxygen is to reduce the size of the pores at the surface of the body, or even to block them up. Unexpectedly, even bodies having a very low porosity, in the order of 1 μm, can be treated by the method of the invention without their porosity being affected.

The nitrogen gas preferably contains between 1% and 5% oxygen relative to the total pressure of the gas.

Doping the nitrogen gas with oxygen further enhances the action of the nitrogen plasma on the porous body.

The nitrogen plasma in the treatment chamber is a remote non-ionic post-discharge nitrogen plasma.

By carrying out the treatment in a chamber relatively remote from the discharge area in which the plasma is generated, it is possible to use a large treatment chamber so that many porous bodies can be treated simultaneously.

The temperature inside the treatment chamber is preferably substantially equal to room temperature.

In an advantageous version of the invention, the porous body is made of sintered powders.

In the method of the invention, the plasma enters the porous body to a depth in the order of 10 cm.

The method of the invention can therefore be used to treat the product when it has its final shape and structure, and the hydrophilic nature of the porous body is not disrupted by subsequent manufacturing steps.

Other features and advantages of the invention will emerge further from the following description and from the accompanying drawings, which are given by way of non-limiting example.

BRIEF DESCRIPTION OF THE DRAWINGS

FIG. 1 is a diagram showing one embodiment of a device for carrying out the method in accordance with the invention.

FIG. 2 is a cross-sectional view taken along the line II—II in FIG. 1.

FIG. 3A is a cross-sectional view showing the wettability of a porous body treated by a prior art method.

FIG. 3B is a view similar to FIG. 3A of a porous body treated by the method of the invention.

DETAILED DESCRIPTION OF THE PREFERRED EMBODIMENTS

A device constituting one embodiment of the invention for implementing a method of increasing the wettability of a porous body 20 vis à vis a fluid will be described first with reference to FIG. 1.

The device comprises means 10, 11 for supplying nitrogen gas in a discharge cavity 12.

The nitrogen gas preferably contains a small amount of oxygen, in the order of 1% to 5% relative to the total pressure of the gas.

A source 10 of nitrogen gas and a source 11 of oxygen are therefore connected to the discharge cavity 12.

Means 13, 14 for introducing an electromagnetic wave into the discharge cavity 12 comprise a wave generator 14 which produces an electromagnetic wave in the discharge cavity 12 using a magnetron.

The range of frequencies that can be used is very wide: microwave frequencies in the order of 800 MHz–915 MHz or 2 450 MHz are generally chosen. Lower frequencies, in the order of 13.56 MHz, 27.12 MHz or 433 MHz may also be used.

A waveguide 2 is provided between the outlet of the generator 14 and the discharge cavity 12. A water circulator 13 is provided around this waveguide 2 to cool it.

A chamber 15 is provided for delayed (relative to the discharge) introduction of the plasma into a treatment chamber 16 containing the porous body to be treated. The chamber 15 extends between the discharge cavity 12 and the treatment chamber 16.

As shown in FIG. 2, the treatment chamber 16 contains a rotary reactor 17 in which the porous bodies 20 to be treated are agitated. A large number of bodies 20 can be treated simultaneously.

The reactor 17 is rotated by a motor 18 in a manner that is known in itself, projections 17a inside the reactor agitating the porous bodies 20.

A door 16a is provided on one face of the treatment chamber 16 for inserting and removing the products to be treated.

As shown by the various arrows in FIG. 1, the delayed nitrogen plasma passes through the treatment chamber 16 and the reactor 17 and is then recovered by a pump unit 19. This pump unit 19 reduces the pressure in the treatment chamber so that the nitrogen plasma is aspirated into the treatment chamber 16.

When the method of the invention is implemented by means of the device described hereinabove, the porous body 20 is exposed to a delayed cold nitrogen plasma in the treatment chamber 16, i.e. to a remote non-ionic post-discharge nitrogen plasma.

The body 20 may be made of sintered powders such as polyethylene or polyproplene powders, for example. It may be made of one or more polymer or composite materials.

The porous bodies 20 are generally made by sintering at a temperature in the order of 220° C. The powders used frequently have a grain size between 1 µm and 1 000 µm, the porous body then having a porosity in the range from 1 µm to 50 µm.

Other porous bodies 20 can be treated effectively by the method of the invention: by way of non-limiting example, these include natural or acrylic and polyester synthetic textile fibers, various plastics materials, ceramics, etc.

In one application of this method the porous body 20 is the writing tip of a marker, shown in cross-section in FIG. 3B, this tip being adapted to come into contact with a reservoir of ink.

These felt-tip pen or marker tips are generally made by sintering polyethylene or polypropylene powders in the manner explained above.

In FIG. 3A and 3B, the ink inside the pores of the porous body 20 is shown by the thick black lines.

It can be seen that, using the method of the invention, the tip 20 shown in FIG. 3B is rendered homogeneously wettable throughout its structure.

The tip 20 shown in cross-section in FIG. 3A, treated by a conventional method, does not have this homogeneously hydrophilic character throughout its structure, however.

The ink penetrates the pores of the body 20 from FIG. 3A only at the surface, whereas in tips 20 treated by the method of the invention the ink is absorbed into the pores of the tip right to its center (see FIG. 3B).

Another use of the method of the invention is to treat filter membranes, in particular for the subsequent use in selective filtration.

The method of the invention can also be used to treat porous bodies in the form of electrolytic or electrophoretic membranes.

Many modifications may of course be made to the examples described hereinabove without departing from the scope of the invention.

There is claimed:

1. A method for increasing homogeneously the wettability of a porous body vis à vis a fluid, comprising the following steps:

generating a nitrogen plasma by an electromagnetic wave discharge in nitrogen-containing gas;

exposing in a treatment chamber said porous body to a remote non-ionic post-discharge nitrogen plasma; and treating side porous body in order that the non-ionic post discharge nitrogen plasma penetrates in the mass of said porous body.

2. The method claimed in claim 1 wherein said nitrogen-containing gas contains between 1% and 5% oxygen relative to the total pressure of the gas.

3. The method claimed in claim 1 wherein the treatment chamber is at a temperature substantially equal to room temperature.

4. The method claimed in claim 1 wherein said porous body is made of one or more polymer or composite materials.

5. The method claimed in claim 1 wherein said porous body is made of sintered powders.

6. The method claimed in claim 1 wherein said porous body contains polyethylene.

7. The method claimed in claim 1 wherein said porous body contains polyproplene.

8. The method claimed in claim 1 wherein said plasma penetrates said porous body to a depth in the order of 10 cm.

9. The method claimed in claim 1 wherein said porous body is made of textile fibers.

10. The method claimed in claim 1 wherein said porous body has a porosity between 1 µm and 50 µm.

11. The method as claimed in claim 1 wherein said porous body is a writing tip of a marker and is adapted to be in contact with a reservoir of ink.

12. The method as claimed in claim 1 wherein said porous body is a filter membrane.

13. The method as claimed in claim 1 wherein said porous body is an electrolysis or electrophoresis membrane.

14. The method as claimed in claim 1, wherein a plurality of porous bodies are treated simultaneously in the treatment chamber.

15. The method as claimed in claim 14, wherein said plurality of porous bodies being treated in the treatment chamber are agitated by rotation.

\* \* \* \* \*

UNITED STATES PATENT AND TRADEMARK OFFICE
CERTIFICATE OF CORRECTION

PATENT NO : 6,074,534
DATED : June 13, 2000
INVENTOR(S) : Goudmand et al

It is certified that error appears in the above-identified patent and that said Letters Patent are hereby corrected as shown below:

Column 4, line 20 - delete "side" and insert --said--

Signed and Sealed this

Twenty-seventh Day of March, 2001

Attest:

NICHOLAS P. GODICI

Attesting Officer

Acting Director of the United States Patent and Trademark Office